Jan. 13, 1942.　　　R. M. FENTON　　　2,269,714
BLANKING APPARATUS
Filed Nov. 26, 1938　　　2 Sheets-Sheet 1

INVENTOR
RAY M. FENTON
BY
ATTORNEY.

Jan. 13, 1942.        R. M. FENTON                2,269,714
                    BLANKING APPARATUS
                    Filed Nov. 26, 1938            2 Sheets-Sheet 2

INVENTOR
RAY M. FENTON
BY
ATTORNEY.

Patented Jan. 13, 1942

2,269,714

UNITED STATES PATENT OFFICE 2,269,714

BLANKING APPARATUS

Ray M. Fenton, University Heights, Ohio, assignor to The Midland Steel Products Company, Cleveland, Ohio, a corporation of Ohio Application November 26, 1938, Serial No. 242,554

14 Claims. (Cl. 164—49)

This invention relates to new and useful improvements in blanking apparatus and more particularly to a shearing apparatus for hot steel strip lines.

An important object of the invention is to provide apparatus for a continuous hot strip line by which continuously moving steel strip is cut obliquely and transversely of the strip into sheets of any predetermined size and rhomboidal shape.

Other objects and advantages of the invention will become apparent during the course of the following description.

In the accompanying drawings forming a part of the application and wherein like numerals are employed to designate like parts throughout the several views.

Figure 1:
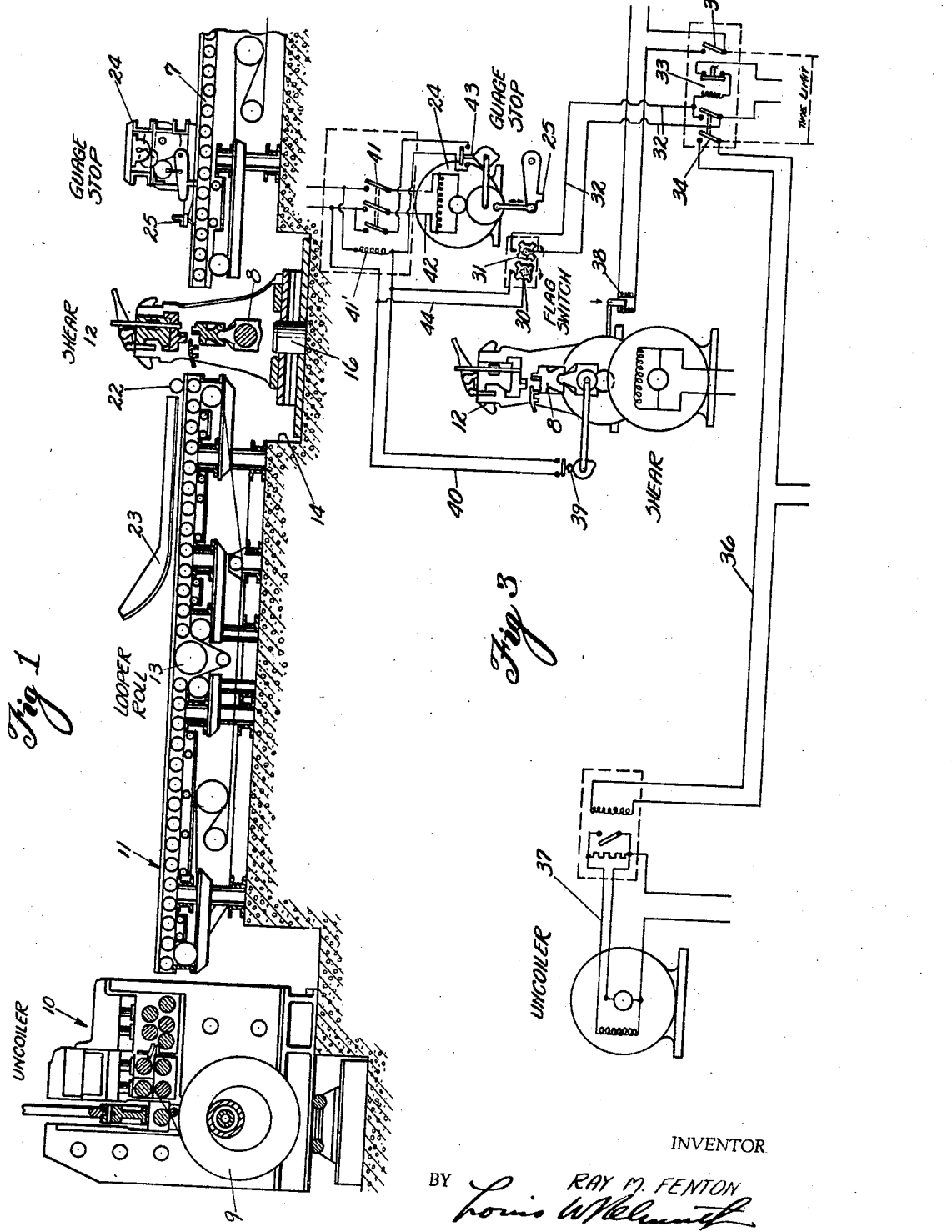
Figure 2:
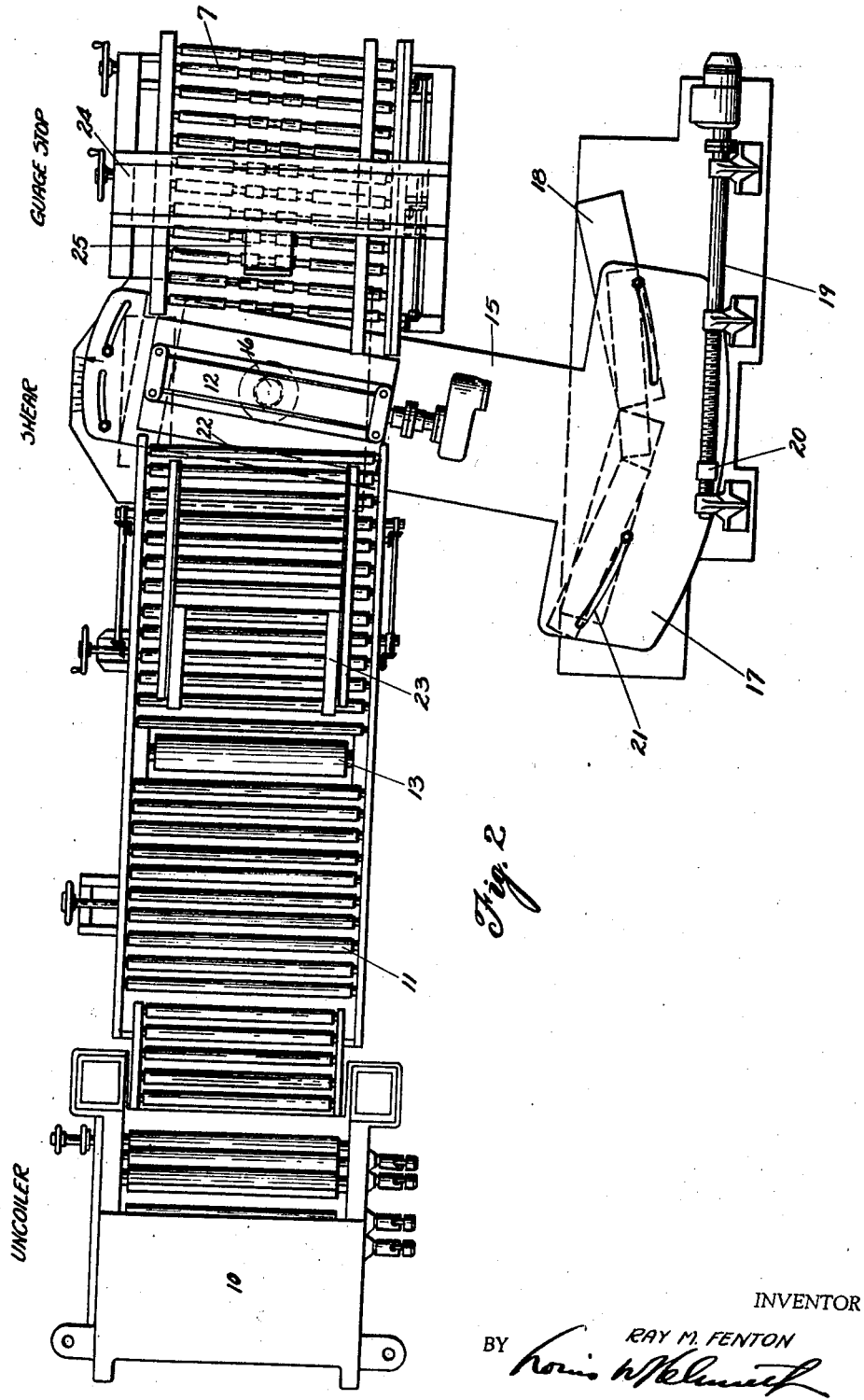

Fig. 1 is a longitudinal section through the hot strip line designed for cutting the sheets, Fig. 2 is a top plan thereof, Fig. 3 is a diagrammatic illustration of the controls therefor.

Heretofore steel mills have only been able to furnish sheets of steel from continuous mills or lines in rectangular sheets. This of course means that the shear or cutter associated with such mill was disposed transversely at right angles to the longitudinal center line of the steel strip. Recently it became necessary to supply sheets of a variety of rhomboidal shapes instead of the usual rectangular shape and these had to be produced in a continuous manner.

As one example of obtaining these rhomboidal sheets, on a hot strip line, strip steel in the form of a three or four ton coil 9, is placed in an uncoiler 10 to be uncoiled and continuously fed out upon constantly rotating leveler table rolls 11 toward an up-cut shear 12 located some distance along the hot strip line. A looper roll 13 is included in the leveler table to handle the slack in the strip produced by stoppage of the leading end of the strip and during operation of the shear. This shear operates in a pit 14 located between the leveler table and a continuation of the line made up by obliquely disposed driven rolls of a gauger table 7. The shear is provided with an up-cut blade 8 and is mounted upon a base 15 which extends transversely across the hot strip line. This base is mounted to turn about a post 16 anchored in the middle of the pit on the longitudinal center line of the hot-strip line. This base is T-shaped in plan and the post 16 extends through a bearing in the stem of the T so that the bridge 17 of the T is located a distance to one side of the line. The base 15 is shiftable laterally on suitable blocks or slides 18 mounted in the foundation. A reversible motor driven jack or screwshaft 19 journaled on the foundation cooperates with a nut 20 swiveled and radially movable on the base 15 whereby rotation of this shaft in one direction swings and adjusts the shear base clockwise, and rotation in the opposite direction swings or adjusts the base counterclockwise. In this manner the blade of the shear can be adjusted to any angle up to 20 degrees with respect to a plane normal and transverse to the longitudinal center of the cut-up line. Opposite ends of the shear base are provided with arcuate slots 21, through which extend studs with nuts for guiding and locking the base in any of its angular adjustments. It will be noted that the ends of the leveler and gauger tables overhang the shear base to insure proper feed of the strip to and from the shear. Positive feed of the strip to the shear is assured by pincher rolls 22 at the shear end of the leveler table. In advance of the pincher rolls, is a width gauge 23 which locates the feed of the strip with reference to the transverse dimension of the table. The throat of the shear is located in all of its positions, so that the pincher rolls feed the strip through the throat and discharge it on the driven rolls of the gauger table 7.

The gauge stop mechanism 24 is mounted transversely above the gauger table rolls and is provided with a gauge stop 25 normally arranged in the path of the leading edge of the steel strip to stop the same a predetermined distance from the shear blade and insure cutting off pieces of strip in the form of sheets of predetermined length. When the strip approaches the stop 25, the speed of the leveler rolls is slowed down by a flag switch, and the leading end of the strip is stopped by the gauge stop with the result that the strip back of the pincher rolls is slackened by the looper roll to gather slack during the interval the shear operates. The flag switch throws in a time limit switch and the shear begins to operate to cut the strip transversely. Upon initiation of opening movement of the shear the gauge stop is automatically raised and the gauge rolls continue to rotate to convey the cut sheet from under the stop. As a second flag switch is operated by the trailing edge of the cut sheet, a motor drive for the gauge stop then lowers the stop 25 to rest upon the outmoving cut sheet in position to abut the new leading edge of the strip, and the uncoiler and leveler normal speed is resumed by the time limit switch to feed the new leading edge through the throat of the shear and against the gauge stop to again stop the leading end of the strip and to cause a repetition of the operations of the apparatus. These operations continue automatically until the required number of rhomboidal sheets have been cut. The angle of the shear can be changed by loosening the nuts and shifting the shear base about the post 16. The length the sheets are to be cut, can also be varied by adjusting the gauge stop carriage lengthwise of the table.

The control apparatus includes a pair of flag switches 30 and 31 arranged above the strip just in advance of the gauge stop. These switches, constructed to momentarily close and open, are mounted upon the same transverse shaft and are ratcheted so that switch 30 operates its contacts only as its contact arm drops off of the trailing end of the sheet to complete a circuit to lower the gauge stop. The flag switch 31 is ratcheted so that its arm is swung by engagement with the leading end of the strip to make the contacts necessary to complete a circuit which slows down the uncoiler and sets the switch to start the shear in operation after a predetermined time. When the leading edge of the strip passes under switch 31, its arm is raised to momentarily close and open a circuit 32 including a relay 33, which operates switches 34 and 35 and sets a time limit switch. Closing of switch 34 closes motor control circuit 36 to slow down the uncoiler motor 37 while the strip is being cut. At the same time, switch 35 energizes shear coil 38 which starts the operation of the shear 8 and its cam control switch 39. This cam switch closes once for each complete stroke of the shear, so that after the shear has cut the strip and starts to open, the gauge line circuit 40 is closed to throw in the switches 41 including an interlocker to the gauge motor circuit 42 for raising the gauge stop 25 out of the way of the cut blank to permit it to be moved on along the gauger table 7 by the driven rolls thereof. The gauge stop is provided with a cam switch 43 connected with coil 41' which breaks the gauge motor circuit at the limits of the up and down stroke of the gauge stop 25. Thus, the gauge stop is held elevated until flag switch 30 is operated by its arm dropping off of the trailing end of the cut blank, to thereby complete circuit 44 through the coil 41' to again start the gauge motor to lower the stop 25 into position to abut the leading edge of the strip. The time limit switch in the meantime, resumes the normal feeding speed of the uncoiler and leveler rolls to rapidly feed the leading edge of the strip through the shear to the flag switches, where the same operations are initiated and the apparatus automatically repeats the operations.

Having thus disclosed one embodiment of the invention, it will be understood that variations therein and substitution of equivalents may be made without departing from the scope of the appended claims.

I claim:

1. A metal strip cut-up line comprising a pair of spaced horizontal conveyors; a shear mounted between the conveyors to receive strip from one for delivery to the other, said shear being movable to turn horizontally whereby the angularity of its cut with respect to the longitudinal dimension of the strip can be varied and means for operating the shear to cut the strip at predetermined intervals, and means for retarding one conveyor while the shear is in operation.

2. A cut-up line comprising a pair of conveyors arranged in spaced longitudinal alignment to feed stock from one to the other, a pit therebetween, a base fulcrumed in said pit transversely of the longitudinal dimension of said line and extending beyond one side thereof, means at said extended side to adjust the base about said fulcrum, and a shear mounted upon said base to turn with its throat in the plane of said conveyors to cut the stock obliquely to its longitudinal dimension as it passes therethrough.

3. A cut-up line comprising conveyors arranged in spaced relation to substantially continuously feed stock from one to the other, and a shear arranged between the conveyors with its shear blade disposed obliquely to the longitudinal edges of the stock and means causing the shear to cut the stock while a portion of the strip is stopped and its feed is continued during the cutting operation.

4. A cut-up line comprising means for continuously feeding strip steel, a gauger table to receive the strip, a power driven shear between the two, a motor driven gauge stop associated with said table against which the end of the strip abuts, a flag switch located on the table ahead of the stop, a time limit switch connected to the flag switch to operate the shear, and a second flag switch in circuit with the shear operating to elevate the gauge stop upon completion of the shearing operation.

5. A cut-up line comprising means for continuously feeding strip steel, a gauger table to receive the strip, a power driven shear between the two and including a cam switch, a motor driven gauge stop associated with said table against which the end of the strip abuts and provided with a cam switch, a flag switch located on the table ahead of the stop, a time limit switch connected to the flag switch to operate the shear, and a second flag switch connectible with the cam switches of the shear and gauge stop for elevating the gauge stop upon completion of the shearing operation.

6. A metal strip cutup line comprising a series of rollers forming a conveyor to feed the metal strip lengthwise, a second series of rollers spaced from the first series to form a second conveyor, a metal shear disposed between the conveyors with its blade arranged transversely thereof, said shear being fulcrumed on a vertical axis at substantially the longitudinal center line of the conveyors, and power driven means at one side of the conveyor for turning the shear about said axis.

7. A metal strip cutup line comprising a series of rollers forming a conveyor to feed the metal strip lengthwise, a second series of rollers spaced from the first series to form a second conveyor, a metal shear disposed between the conveyors with its blade arranged transversely thereof, said shear being fulcrumed on a vertical axis at substantially the longitudinal center line of the conveyors, and means for locking the shear in angularly adjusted position.

8. A metal strip cutup line comprising a series of rollers forming a conveyor to feed the metal strip lengthwise, a second series of rollers spaced from the first series to form a second conveyor, a substantially T-shaped base disposed between the conveyors and adapted to support a metal shear with its blade transversely of the conveyors, the stem of said T-shaped base extending transversely of the conveyors and mounted to turn about a vertical axis located at substantially the longitudinal center line of the conveyors, the arm of said T-shaped base having a nut swivelly mounted thereon, a threaded shaft mounted in bearings alongside of the conveyors and threadedly engaged with said nut to adjust the base angularly about its axis.

9. A metal strip cutup line comprising a series of rollers forming a conveyor to feed the metal strip lengthwise, a second series of rollers spaced from the first series to form a second conveyor, a substantially T-shaped base disposed between the conveyors and adapted to support a metal shear with its blade arranged transversely of the conveyors, the stem of said T-shaped base extending transversely of the conveyors and mounted to turn about a vertical axis located at substantially the longitudinal center line of the conveyors, said stem having an arcuate slot, the arm of said T-shaped base having an arcuate slot struck from the axis, a nut swivelly mounted on the base, a threaded shaft mounted in bearings alongside of the conveyors and threadedly engaged with said nut to adjust the base angularly about its axis, and bolts with nuts extending through said arcuate slots to clamp the base on diametrically opposite points relative to its axis in adjusted position.

10. A metal strip cutup line comprising means for continuously feeding metal strip, a gauger table including driven rolls to receive and move the strip longitudinally, a power driven shear located between said means and table with its blade arranged transversely of the table, a motor driven vertically movable gauge stop associated with said table against which the leading cut end of the strip is adapted to abut, a flag switch located on the table ahead of the stop and connected with said feed means to retard its speed when engaged by the cut end of said strip, a time limit switch connected with said flag switch to operate the shear when the flag switch is engaged by the strip, a switch operated by the shear to raise the gauge stop, and a second flag switch in circuit with the shear and gauge stop adapted to be operated by the trailing cut end of the strip to lower the gauge stop into the path of movement of the feeding cut end of the strip.

11. A metal strip cut up line comprising a shear, means for continuously feeding metal strip thereto, means for operating the shear to cut the strip transversely of its longitudinal dimension, and means for stopping the movement of a portion of said strip while the shear is in operation and while another portion of the strip is being fed toward the shear.

12. A cut up line comprising a conveyor arranged to feed strip steel, a pit at the end thereof, a base fulcrumed in said pit transversely of the longitudinal dimension of said line and extending beyond one side thereof, means at said extended side to adjust the base about said fulcrum, and a shear mounted upon said base to turn with its throat in the plane of said conveyor to cut the stock obliquely to its longitudinal dimension as it passes therethrough.

13. A metal strip cut up line comprising a conveyor to feed the metal strip lengthwise, a metal shear disposed at the end of the conveyor with its blade arranged transversely thereof, said shear being fulcrumed on a vertical axis at substantially the longitudinal center line of the conveyor, and means at one side of the conveyor for turning the shear about said axis.

14. A cut-up line comprising a conveyor to feed strip material lengthwise, a shear disposed at one end of the conveyor with its blade arranged transversely thereof, said shear being pivoted on a vertical axis at substantially the longitudinal center line of the conveyor, and means for adjusting the shear about said axis and for locking the shear in any adjusted position to hold the blade of the shear at any desired angular position transverse to the conveyor.

RAY M. FENTON.